Aug. 1, 1933.  A. G. F. WALLGREN  1,920,723
BEARING
Filed Dec. 2, 1929
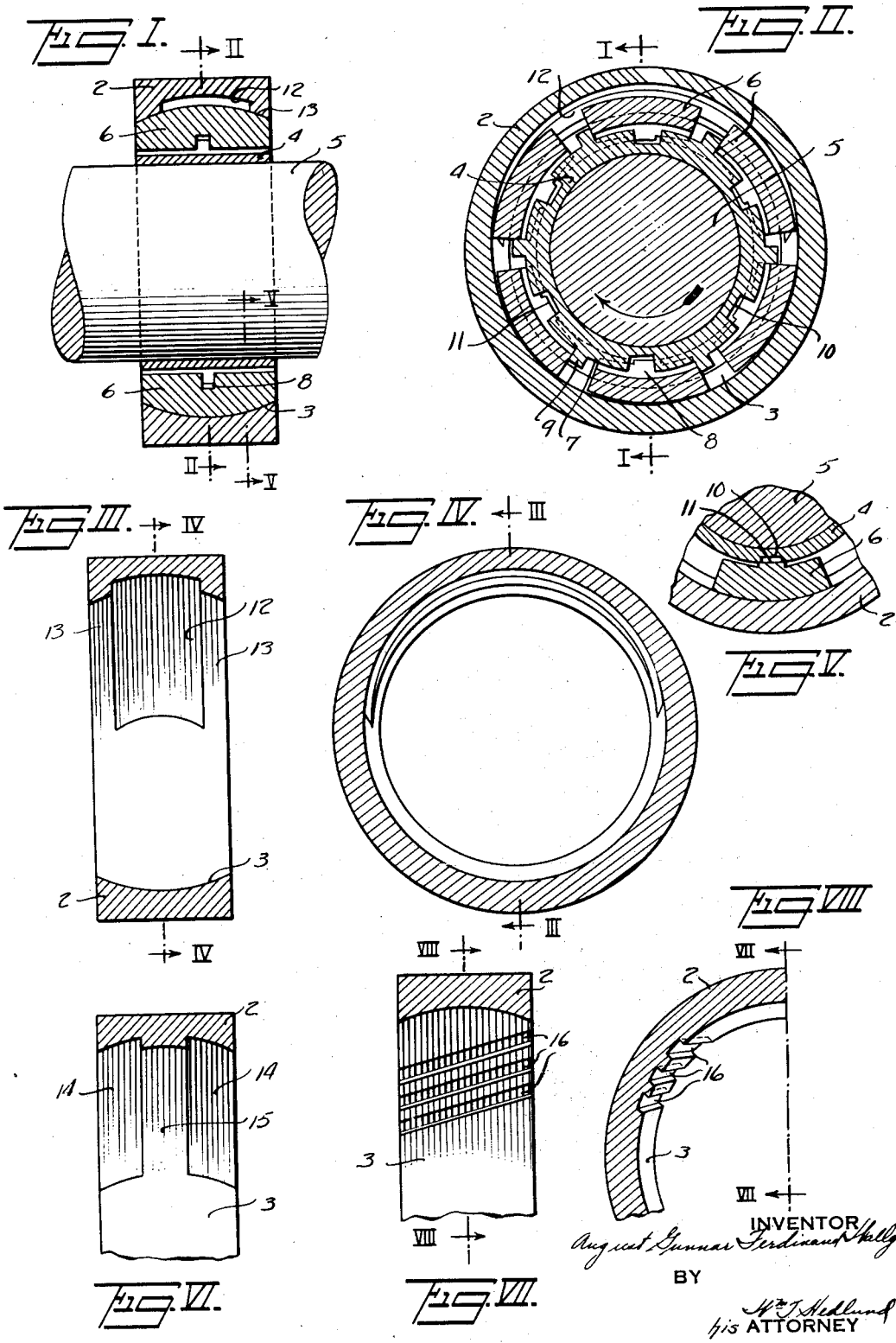

Patented Aug. 1, 1933

1,920,723

UNITED STATES PATENT OFFICE 1,920,723

BEARING

August Gunnar Ferdinand Wallgren, Stockholm, Sweden, assignor to Aktiebolaget Nomy, Stockholm, Sweden, a Corporation of Sweden Application December 2, 1929, Serial No. 410,918, and in Sweden December 8, 1928

16 Claims. (Cl. 308—73)

My invention relates to bearings and more particularly to bearings of the type which includes a plurality of tiltable bearing blocks. Still more particularly the invention relates to bearings of the radial type employing tilting blocks or of other types wherein the pressure on any block is different for different positions of the block relative to other parts of the bearing.

In radial bearings of the type employing tiltable blocks and in which, as a result of tilting of the blocks, oil films are formed, there are positions in the relative rotation of the parts wherein the load is light compared to other positions. The oil film being such as to take care of the heaviest load, at the position or positions of lighter load it is unnecessary to have an oil film of such great load carrying capacity as in the position or positions of heavy load. If the oil film formed with respect to any block is uniform for all positions of rotation of the block, or rotation of a part relative to such block, there is an unnecessary loss in the efficiency of the bearing. The purpose of the invention is, so to speak, to unload the block or co-operating part in the positions of diminished load. This is accomplished by providing an arrangement whereby the effective bearing surface is reduced so that the oil film pressure is diminished.

Further objects and the nature and advantages of the invention will become apparent on consideration of the following description taken in conjunction with the accompanying drawing showing several forms of apparatus embodying the invention, which drawing is a part of this specification.

With reference to the drawing:

Fig. I is a longitudinal or axial cross-sectional view taken on the line I—I of Fig. II through a bearing embodying the invention.

Fig. II is a transverse view taken on the line II—II of Fig. I;

Fig. III is a cross-sectional view of a part of the bearing of Fig. I taken on the line III—III of Fig. IV;

Fig. IV is a cross-sectional view taken on the line IV—IV of Fig. III.

Fig. V is a cross-sectional view taken on the line V—V of Fig. I.

Fig. VI is a cross-sectional view of a part of a bearing showing a modified form of the invention;

Fig. VII is a cross-sectional view taken on the line VII—VII of Fig. VIII and shows still another embodiment of the invention; and Fig. VIII is a cross-sectional view taken on the line VIII—VIII of Fig. VII.

Referring to Figs. I to V, the bearing illustrated comprises a stationary member 2. Member 2 surrounds the shaft 5 and may, if desired, be made of two parts suitably held together. Member 2 is an outer ring member or race ring. Within ring member 2 is an inner ring or rotary member 4 which is fixed to the shaft and which may likewise be made up of a plurality of parts. Radially disposed between the rotary and stationary members is a series of bearing blocks 6. Member 2 has an inner surface 3 of general spherical form. Bearing blocks 6 have outer spherical surfaces adjacent and co-operating with surface 3.

Each block 6 has a transverse groove 8. Projections 9 on member 4 extend into grooves 8. The purpose of this is to prevent relative axial movement of blocks 6 and rotary member 4. Projections 9 have another purpose, to provide abutment surfaces for engaging the blocks to move them rotationally with member 4. Each block 6 works in the space between adjacent abutment surfaces of adjacent projections 9.

At each side of the central groove 8, each block is shaped as shown in Fig. V. There is an inner surface 11 on each block on the edges of which are offsets extending axially. Midway between adjacent projections 9, in member 4, are grooves 10 extending the full width thereof. The edges of the blocks adjacent surface 3 are preferably bevelled to facilitate entrance of oil between the spherical surfaces of the block and the stationary member 2.

For further reference to the structure of this type of bearing, refrence may be had to my copending application Serial No. 277,769 filed May 14, 1928, Patent No. 1,871,485, in which I have described and claimed this type of bearing.

In general, the operation of the bearing is as follows:

Assume that blocks 6 are in the centralized position shown in Fig. V. Assume now that shaft 5 is rotated. Projections 9 on member 4 (see Fig. 2) will advance toward the respective blocks. This relative rotation between member 4 and the blocks will move the groove 10 in member 4 for each block before the block itself is moved, as a result of which the block can tilt by having one edge of the centrally raised surface 11 thereon slip radially inwardly into groove 10. This relative movement between member 4 and the blocks may not take place immediately between member 4 and such of the blocks that are under load. However, when such blocks are carried by the rotation of member 4 to the unloaded portion of the bearing, the above described relative movement between member 4 and the blocks will occur. The projections 9 serve as abutments and carry the blocks along so tilted. Should the shaft be reversed, the blocks will pass through the middle position and will be tilted in the opposite way. The tilting of the blocks form wedges between the blocks and the bearing surface 3. The oil with which the bearing is lubricated is forced into these wedges and exerts a high pressure which makes it possible to carry a heavy load with this type of bearing.

It will be seen that when any block 6 has reached its top-most position in the bearing, there is no downward load on the block. Therefore, it is unnecessary to have the same character of oil film on the top of the bearing as at the bottom of the bearing. The creating of a high pressure in the wedge space causes a pressure against the parts which is a part of the load factor of the bearing.

In accordance with the present invention, I avoid this additional load, or, in other words, eliminate or diminish the effect which is produced by the creating of the oil films, at the positions where the oil films are not necessary or necessary in less degree to take care of the bearing stresses.

I produce the unloading in the embodiment shown in Figs. I—IV by cutting away the spherical surface on the inside of the annular member 2 in the upper part of the bearing. The cut away portion is indicated at 12. This channel 12 is formed in the middle part of the member 2. This reduces the contacting or substantially contacting surface or load transmitting area while at the same time leaving portions of the contacting surface to guide the members axially with respect to each other and to keep them in axial alignment.

In Fig. VI instead of providing one central cut away part, I have formed two grooves 14 on the outside edges. In Fig. VII and Fig. VIII oblique grooves 16 are formed in the upper part of the stationary bearing ring which serve for the same purpose. A plurality of grooves such as 16 may be provided axially. Furthermore it is not necessary that the grooves extend the whole width of the bearing ring.

Instead of having the blocks rotate, the blocks may be stationary and a co-operating annular ring may rotate in which case the same effect can be obtained, at least in some instances, by cutting away the surfaces of the blocks against which the oil films are formed in the unloaded portion of the bearing.

While I have described several forms of the invention, it will be understood that the invention can be embodied in many more forms and is not limited to the apparatus described.

What I claim is:

1. A bearing of the character described comprising an annular bearing ring having an internal surface of generally spherical form, a plurality of bearing blocks having operative positions within said ring and adjacent said spherical surface, means for tilting said blocks and said surface being cut away at a portion thereof.

2. A bearing of the character described comprising an annular bearing ring having an internal surface of generally spherical form, a plurality of bearing blocks having operative positions within said ring and adjacent said spherical surface, means for tilting said blocks and part of said surface being grooved.

3. A bearing of the character set forth comprising a plurality of tiltable blocks and an annular member having a bearing surface co-operating with said blocks, said bearing surface providing less contact area for the blocks in the upper portion thereof than the lower portion thereof.

4. A bearing of the character described comprising relatively movable members including a member having a continuous bearing surface and a plurality of bearing blocks having surfaces cooperating with said continuous surface and movable with relation thereto, said continuous surface being grooved to present load transmitting areas of different extent at different parts of said surface.

5. A bearing of the character described comprising a member having a bearing surface and a plurality of bearing blocks adapted to slide with respect to said surface and to sustain loads of different value when in different positions with respect to said surface, said surface providing less load transmitting area for the blocks when they are in positions sustaining relatively light load than when they are in positions sustaining relatively heavy load.

6. A bearing of the character described comprising a member having a bearing surface and a plurality of bearing blocks adapted to slide with respect to said surface and to sustain loads of different value when in different positions with respect to said surface, said surface being grooved to present load transmitting area of reduced extent at positions of the blocks where they sustain relatively light load.

7. A bearing of the character described comprising a bearing member and a plurality of bearing blocks adapted to slide with respect to said member, said member and said blocks providing cooperating surfaces adapted to sustain loads of different value in different positions of the blocks relative to said member, said surfaces providing less load transmitting area at positions of relatively light load on the blocks than at positions of relatively heavy load on the blocks.

8. A bearing of the character described comprising a bearing member and a plurality of bearing blocks adapted to slide with respect to said member, said member and said blocks providing cooperating surfaces adapted to sustain loads of different value in different positions of the blocks relative to said member, one of said surfaces being grooved to provide less load transmitting area at positions of relatively light load on the blocks than at positions of relatively heavy load on the blocks.

9. A bearing of the radial type comprising inner and outer bearing members and a plurality of bearing blocks positioned radially between said members and adapted to rotate with the inner member, the outer member and the blocks having surfaces adapted to slide relative to each other and cooperating to form a load-sustaining oil film therebetween, the extent of the cooperating surfaces per unit of circumferential length being different at different parts of said outer member.

10. A bearing of the radial type comprising inner and outer bearing members and a plurality of bearing blocks positioned radially between said members and adapted to rotate with the inner member, the outer member and the blocks having surfaces adapted to slide relative to each other and cooperating to form a load-sustaining oil film therebetween, a part of the outer member being grooved to reduce the extent of the cooperating surfaces per unit of circumferential length at said part.

11. In a radial bearing of the character described, the combination with a plurality of bearing blocks of an outer annular bearing member cooperating with said blocks and having a generally spherical inner bearing surface, said surface being recessed at one part of its circumference to provide less load transmitting area per unit of circumferential length than at other parts of its circumference.

12. In a radial bearing of the character described, the combination with a plurality of bearing blocks of an outer annular bearing member cooperating with said blocks and having a generally spherical inner bearing surface, said surface being circumferentially grooved.

13. In a radial bearing of the character described, the combination with a plurality of bearing blocks of an outer annular bearing member cooperating with said blocks and having a generally spherical inner bearing surface, said surface being circumferentially grooved for substantially half of its peripheral length.

14. In a radial bearing of the character described, the combination with a plurality of bearing blocks of an outer annular bearing member cooperating with said blocks and having a generally spherical inner bearing surface, the axially central portion of said surface being circumferentially grooved at one part of its circumference to provide less load transmitting area per unit of circumferential length than at other parts of its circumference.

15. In a radial bearing of the character described, the combination with a plurality of bearing blocks of an outer annular bearing member cooperating with said blocks and having a generally spherical inner bearing surface, said surface being circumferentially grooved at its axial ends at one part of its circumference to provide less load transmitting area per unit of circumferential length than at other parts of its circumference.

16. In a radial bearing of the character described, the combination with a plurality of bearing blocks of an outer annular bearing member cooperating with said blocks and having a generally spherical inner bearing surface, said surface being grooved in generally axial direction to provide less load transmitting area per unit of circumferential length at one part of its circumference than at other parts.

AUGUST GUNNAR FERDI-
    NAND WALLGREN.